United States Patent [19]

Goodman

[11] Patent Number: 4,753,394
[45] Date of Patent: Jun. 28, 1988

[54] TRICKLE IRRIGATION SYSTEMS WITH IMPROVED EMITTERS

[76] Inventor: Clarence R. Goodman, 4727 W. Marlette, Glendale, Ariz. 85301

[21] Appl. No.: 902,947

[22] Filed: Sep. 2, 1986

Related U.S. Application Data

[63] Continuation of Ser. No. 639,731, Aug. 13, 1984, abandoned.

[51] Int. Cl.⁴ .......................... B05B 15/00; B05B 1/30; A62C 31/32; F16K 31/18
[52] U.S. Cl. ..................................... 239/542; 137/430; 239/276; 239/562; 239/571; 239/572
[58] Field of Search ................ 239/76, 542, 572, 571, 239/276; 239/193, 271, 562; 137/433, 430

[56] References Cited

U.S. PATENT DOCUMENTS

| | | | |
|---|---|---|---|
| 628,581 | 7/1899 | Grosswyler | 137/433 |
| 1,650,081 | 11/1927 | Lindsay | 239/271 |
| 1,945,429 | 1/1934 | Fowler | 137/433 |
| 2,324,234 | 7/1943 | Peters | 239/542 |
| 2,598,961 | 6/1952 | Andrus | 239/542 |
| 2,721,620 | 10/1955 | Geer et al. | 137/433 |
| 3,425,632 | 2/1969 | Stout | 239/276 |
| 4,161,290 | 7/1979 | Hill | 239/542 |
| 4,194,695 | 3/1980 | Schopp | 239/542 |

FOREIGN PATENT DOCUMENTS

| | | | |
|---|---|---|---|
| 1261336 | 4/1961 | France | 137/433 |
| 137986 | 1/1920 | United Kingdom | 137/433 |
| 271168 | 5/1970 | U.S.S.R. | 239/542 |
| 782766 | 11/1980 | U.S.S.R. | 239/542 |
| 858670 | 8/1981 | U.S.S.R. | 239/570 |

*Primary Examiner*—Andres Kashnikow
*Assistant Examiner*—Patrick N. Burkhart
*Attorney, Agent, or Firm*—Cahill, Sutton & Thomas

[57] ABSTRACT

An emitter for receiving water from a trickle irrigation system and emitting the received water at a trickle flow rate to an area to be irrigated. The emitter includes a float controlled water inlet shutoff valve for receiving water from the trickle irrigation system and supplying it to a housing to establish a water supply therein and maintain the water supply at a predetermined substantially constant level above at least one water outlet opening of predetermined size formed in the housing to provide a pressure head which interacts with the size of the water outlet opening to determine the trickle output flow rate of the emitter.

16 Claims, 2 Drawing Sheets

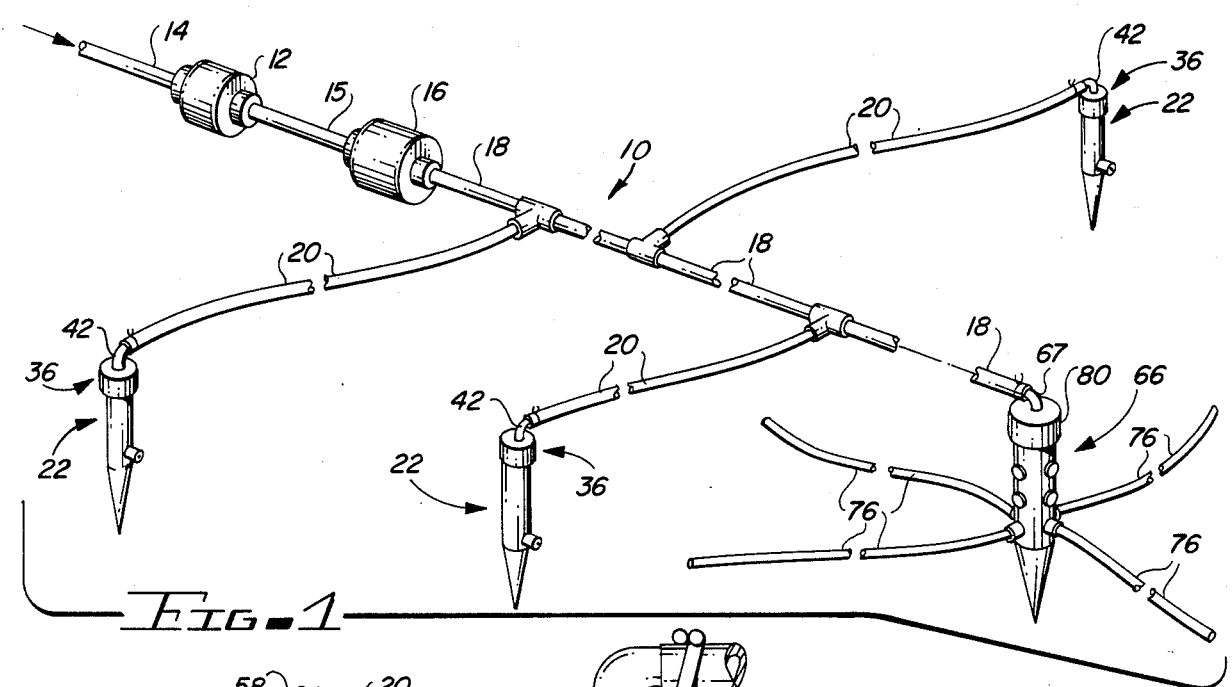
Fig-1
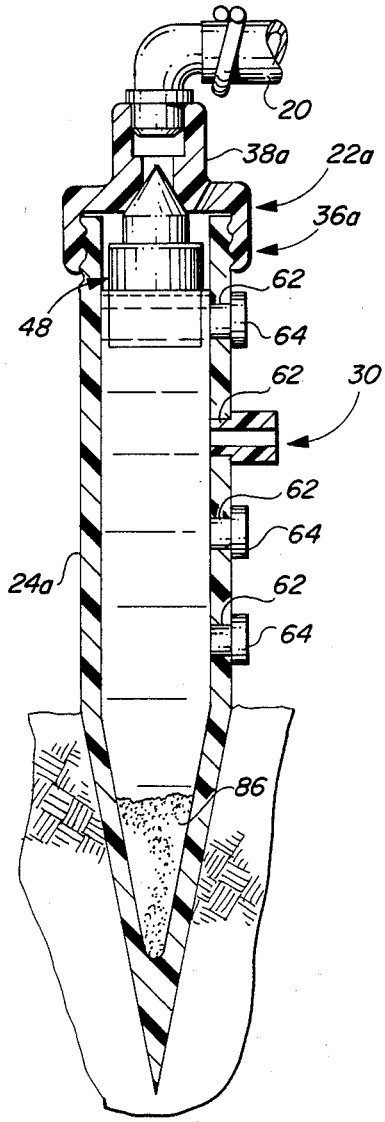
Fig-2
Fig-3

TRICKLE IRRIGATION SYSTEMS WITH IMPROVED EMITTERS

This is a continuation of application, Ser. No. 639,731, filed Aug. 13, 1984, now abandoned.

BACKGROUND OF THE INVENTION

1. Field of the Invention

This invention relates in general to irrigation systems and more particularly to drip, or trickle, irrigation systems with improved emitters.

2. Description of the Prior Art

As is well known in the art, drip or trickle irrigation systems are used to receive water under a relatively high supply line pressure and dispense it to various areas to be irrigated at low pressure and low flow rates. To accomplish this, the relatively high pressure water, usually supplied from a domestic water supply line, or pump, is reduced to an intermediate pressure valve by means of a pressure regulator which is part of the drip irrigation system. The water emerging from the regulator is supplied to a trunk line, or lines, each of which has a plurality of lateral, or branch, lines extending therefrom, and each of the branch lines terminates in an emitter device which is located in an area to be irrigated. The intermediate water pressure valve, i.e. the pressure of the water emerging from the pressure regulator, while lower than the supply line pressure, must be at a value that is high enough to insure that a proper supply and flow of water is provided in the trunk line(s) and the plural branch lines thereof. Therefore, a final pressure drop and controlling of the flow rate is accomplished in the emitters themselves.

In some types of prior art emitters, such as that disclosed in U.S. Pat. No. 3,863,845, the water received from the branch line is passed through a pressure reducing helical path and is emitted through a relatively small orifice to produce the desired drip, or trickle, flow rate. Another form of prior art emitter, as disclosed, for example, in U.S. Pat. No. 3,938,552, includes a pressure reducing vibration element which interacts with a small water outlet orifice to achieve the desired irrigation drip flow rate. In U.S. Pat. No. 4,223,838, a spring-loaded metering plunger cooperates with a small water outlet orifice to achieve the desired flow rate.

As can be appreciated, especially by those familiar with irrigation in arid regions where irrigation is needed most, the water available for irrigation is often contaminated with sand and other foreign matter, and often contains chemicals and usually has a high salt content. Such water can, and often does, cause problems with the pressure regulator devices of the emitters, and is most troublesome with regard to cloging of the pressure reducing structures and the small outlet orifices with foreign particles and deposited minerals.

As a result, drip, or trickle irrigation systems will usually be provided with relatively fine mesh filters up stream of the emitters and of course, such filters are relatively expensive, must be checked rather frequently and cleaned when necessary, and this is a chore which is often neglected. In some systems, the emitters are provided with cleaning devices, some of which must be manually actuated, and others which are alleged to be self-cleaning.

From the above, it will be seen, that the prior art emitters per se, and indeed, the drip irrigation systems themselves, can be quite complex and costly, and even the most efficient and elaborate systems require continuing surveillance and maintenance.

Therefore, a need exists for a new and improved trickle irrigation system and emitters for use therein, which overcome some of the problems and shortcomings of the prior art.

SUMMARY OF THE INVENTION

In accordance with the present invention, new and useful emitters are disclosed for use in drip, or trickle, irrigation systems, with the emitters functioning in a manner which allows overall system simplification and substantially reduces the surveillance and maintenance requirements in comparison to prior art systems.

The emitters of the present invention include a float controlled water inlet valve means which provides initial and make-up water to a free surface reservoir provided in the emitter housing. The emitter housing is configured so that the water contained in the reservoir will remain, under the influence of the float-controlled water inlet valve means, at a substantially constant predetermined height above an outlet opening provided proximate the lower end of the emitter housing. Since the upper surface of the water in the reservoir is free, i.e. open to ambient pressure, the only effective water moving force within the emitter will be that force referred to as the pressure head which, as is well known, increases directly with the depth of the water. Therefore, by providing a shallow reservoir, the pressure head can be made very small without using helical paths, regulator valves or any other prior art pressure reducing structure which, as discussed above, can become clogged with foreign matter. Further, due to the very low head pressures attainable in the emitters of the present invention, the outlet openings in the emitters can be sized so as to freely pass the usual contaminants found in water such as sand, rust particles and the like.

In the preferred embodiment, the emitter housing is of tubular configuration, preferably cylindrical, and is provided with a closed inverted conical, or pointed, lower end for insertion into the ground. A vented, and removable cap is mounted on the upper end of the emitter housing and a suitable fitting is mounted on the cap for connection to one of the branch lines of the trickle irrigation system. The inwardly facing surface of the cap is configured to have a valve seat which cooperatively interacts with a float means to control the inflow of water to the housing through the fitting means. The float means preferably includes a cylindrical float body, which loosely matches the bore formed in the emitter housing, with a valve stem extending axially upwardly therefrom, with the valve stem being configured for seating engagement with the valve seat provided in the cap. The length of the axially extending valve stem and float length of the float body can be determined to establish a predetermined water depth within the emitter housing and several float configurations can be selectively employed in accordance with desired end results.

A plurality of outlet openings are provided in spaced increments along the length of the cylindrical portion of the housing so that a desired one of the plural openings can be selected for use with the unused openings being plugged. This, in addition to the float variations discussed above, provides means for selecting a desired head pressure and thereby controlling the outlet flow rate of the emitter.

The bore provided in the emitter housing extends downwardly from the cylindrical portion of the housing into the closed pointed end and the outlet openings are located above the closed pointed end. Therefore, the entire lower bore portion of the emitter housing acts as a settling chamber, or sediment trap, for foreign matter.

The same basic, but modified type of emitter can be mounted in the trunk line of the trickle irrigation system, as opposed to the embodiment discussed above which is intended for use on the terminal end of a branch line. In this modified form, several radially disposed outlet openings are provided in the emitter housing to simultaneously supply water, at trickle flow rates, to several areas to be irrigated proximate the emitter. To accomplish this, the emitter housing is preferably of larger diameter than the above discussed first embodiment to insure an adequate water supply for simultaneously feeding the several outlets. Flexible hoses are connected to each of the several outlets being used, and the hoses are located so as to discharge the water in the areas to be irrigated.

As will be appreciated, the float means employed to control the inflow of water to the emitters can be designed to provide a considerable buoyancy force to hold the stem thereof in seated engagement with the valve seat provided in the cap, against the line pressure of the branch line or the trunk line. The supply line pressure, such as in a domestic water supply line is, however, a variable which is beyond the control of a user of the system of the present invention. Therefore, in some systems which are connected to relatively low pressure supply lines, the emitters can be used directly without the need for a pressure regulator in the system. However, in most systems a pressure regulator will be needed to reduce the supply line pressure to a value suitable for use with the emitters of the present invention.

A third embodiment of the present invention is provided with a different type of float controlled valve means for use in higher pressure systems. In this third embodiment, a float chamber is provided above the tubular emitter housing, and the float is mounted on the end of a lever arm having its pivot point, or fulcrum, on the opposite end. A freely movable valve stem is in bearing engagement with the lever arm proximate the fulcrum for engaging and disengaging a valve seat provided coaxially in the water outlet passage leading to the emitter. In this manner, the inherent buoyancy of the float body can be increased, in accordance with the amount of mechanical advantage, or leverage, obtained by using the lever arm, to exert considerably increased valve closing forces in comparison to the forces which can otherwise be obtained.

In that the above described emitters of the present invention are substantially free flowing devices which will pass the usual contaminants found in water, and additionally have the above described sediment traps, the filters required in the prior art systems need not be used in the systems employing the emitters of the present invention. It is however, preferred that some sort of a strainer be used in the systems upstream of the emitters as a precautionary measure. The strainers however can be highly simplified structures, such as relatively large mesh screens which are capable of preventing larger than normal foreign matter from entering the emitters. In view of this, the emitters of the present invention substantially reduce the need for surveillance and maintenance required in prior art systems.

Further advantages derived from the emitters of the present invention result from their use in low water pressure, or fluctuating water pressure, trickle irrigation systems. As hereinbefore described, all prior art emitters known to me include some sort of pressure reducing or pressure regulating mechanism to reduce the intermediate trunk line pressure to produce the proper pressure that works with the outlet orifice to achieve the desired trickle outlet flow rate. In order for the pressure reducers or regulators to work properly, the intermediate trunk line pressure must be above a minimum value. In low pressure systems which do not have the minimum trunk line pressure, the outlet flow rate of the emitters will either not be able to achieve the desired output flow rate, fall below the desired rate, and in some instances no output at all will be achieved. In systems having fluctuating trunk line pressures, i.e. sometimes above the minimum pressure value and sometimes below that value, the output flow rate of the emitters will fluctuate right along with the trunk line pressure. To overcome this problem in prior art systems, it is a common practice to provide a suitable pump in the trunk line upstream of the emitters.

Since the emitters of the present invention operate with float controlled shutoff valve means to produce a pressure head in the emitters, the pressure head is completely independent of trunk line pressure and the emitters will continue to operate at a constant output flow rate as long as there is enough pressure in the trunk line to deliver the water to the float controlled shutoff valve.

Accordingly, it is an object of the present invention to provide a new and improved trickle irrigation system and emitters for use therein.

Another object of the present invention is to provide a new and improved trickle irrigation system which is inexpensive to fabricate, simple and reliable in its operation, and substantially reduces the surveillance and maintenance usually associated with such systems.

Another object of the present invention is to provide a new and improved trickle irrigation system wherein the emitters used therein are substantially free flowing so that they will pass the usual contaminants found in water and therefore substantially reduce the degree of filtration required in prior art systems.

Another object of the present invention is to provide a new and improved trickle irrigation system wherein the output flow rate of the emitters is completely independent of the trickle system trunk line pressure and will therefore continue to produce a constant output flow rate with low and fluctuating system trunk line pressures.

Another object of the present invention is to provide a new and improved trickle irrigation system of the above described character wherein the sole water moving force exerted on the water being discharged from the emitters is derived from head pressure resulting from a free surface water supply contained within each of the emitters.

Another object of the present invention is to provide a new and improved trickle irrigation system of the above described type wherein the head pressure water moving forces employed to dispense water allows the emitters to be configured so that no internal clogging thereof can occur and so that the outlet openings of the emitters can be sized to freely pass the foreign matter contaminants usually found in water.

Another object of the present invention is to provide a new and improved trickle irrigation system of the above described character wherein the emitters are configured for selective application of various value head pressure forces for determining the output water flow rate of the emitters.

Another object of the present invention is to provide a new and improved trickle irrigation system of the above described character wherein the emitters thereof are provided with a tubular emitter housing for containing a water supply which is maintained at a substantially constant predetermined depth by a float controlled water inlet valve means.

Another object of the present invention is to provide a new and improved trickle irrigation system of the above described type wherein the emitter housing is provided with selectively usuable plural outlet openings at various distances from the free surface of the water supply to determine the head pressure that is to be acting on the water dispensed by the emitters.

Still another object of the present invention is to provide a new and improved trickle irrigation system of the type described above wherein each of the emitters is provided with a settling chamber, or sediment trap, for collecting foreign matter.

The foregoing, and other objects of the present invention as well as the invention itself, may be more fully understood from the following description when read in conjunction with the accompanying drawings.

BRIEF DESCRIPTION OF THE DRAWINGS

FIG. 1 is a diagramatic illustration showing the trickle irrigation system of the present invention.

FIG. 2 is a sectional view taken longitudinally through a first embodiment of the preferred form of the emitters of the present invention.

FIG. 3 is a sectional view similar to FIG. 2 and showing a modification of the first embodiment of the preferred emitters.

DESCRIPTION OF THE PREFERRED EMBODIMENT

Figure 4:
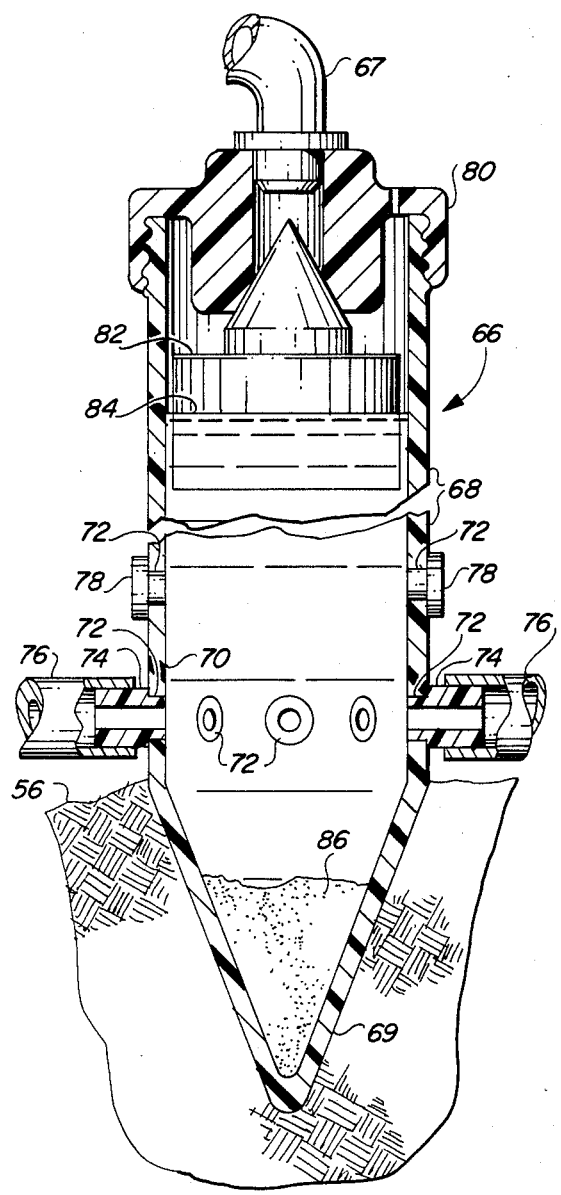
FIG. 4 is a sectional view taken along a vertical plane through a second embodiment of the emitters of the present invention.

Referring more particularly to the drawings, FIG. 1 shows, in diagramatic form, the major components of a trickle, or drip, irrigation system which is indicated generally by the reference numeral 10.

The system 10 includes a pressure regulator 12, which may be any of the various commercially available mechanisms which are in common use in known trickle irrigation systems. The regulator 12 receives water under pressure from a suitable supply line, or conduit 14, such as a domestic water supply line, the output line from a pump (not shown), or the like. The water received by the regulator 12 is normally at relatively high pressure, 50 to 60 PSI being typical, and the regulator functions to reduce that supply pressure to a lower value suitable for use in the system 10. The water at reduced pressure emerging from the regulator 12 is directed, via conduit 15, to a strainer means 16, which is designed to remove relatively large particles and other foreign matter from the water. The water emerging from the strainer 16 is directed into a trunk line 18 which functions as a manifold for a plurality of lateral, or branch lines, 20 which extend from the trunk line 18. Each of the branch lines 20 of the system 10 have their terminal ends connected to an emitter 22 of the present invention, as will hereinafter be described in detail.

It will be understood that the combination of the major components as discussed generally and briefly above is an old combination well known in the trickle irrigation system art. The present invention resides in the emitters 22 which are used in the old combination. However, as this description progresses, it will become apparent that the improved emitters 22 will allow some of the other components of the combination to be dispensed with in some cases, and simplified in others.

As seen in FIG. 2, the emitter 22 includes a tubular housing 24, preferably cylindrical, with external threads 25 on its upper end and having an inverted conical, or pointed, closed lower end 26. The housing 24 defines an axial bore 28 having a lower portion 29 which is located within the conical lower end 26. Water outlet opening means 30, in the preferred form of a boss 31 having an axial passage 32, is mounted in an outlet opening 34 formed in the cylindrical sidewall of the housing 24. The water outlet opening means 30 could also be a simple aperture formed and sized as needed or desired.

An especially configured internally threaded cap 36 is demountably mounted on the upper threaded end 25 of the housing 24. The cap 36 has the usual endless sidewall 37 which defines the axial bore of the cap and in which the internal threads are formed in the conventional manner. A boss 38 depends from the top wall 39 of the cap 36 so as to be coaxially disposed within the bore of the cap, with the boss 38 being configured to extend axially into the open top end of the bore 28 of the housing 24. The boss 38 is provided with an axial passage 40 which is suitably formed on its upper end to receive a fitting means 42, such as the illustrated elbow, and is provided with a valve seat 44 on its lower end. As will hereinafter be described, a vent passage 46 is formed through the cap 36.

A float means 48 is located in the bore 28 of the housing 24 and is configured so as to be freely axially movable in the housing. The float means 48 includes a buoyant body 50 with a shutoff valve stem 52 extending axially upwardly from the buoyant body 50. The free upper end of the valve stem 52 is suitably configured for seated shutoff engagement with the valve seat 44 formed in the cap 36, with the free upper end of the valve stem 52 preferably being of conical shape as at 54 to match the similar configuration of the valve seat 44.

In operation, the emitter 22 is mounted in a ground surface 56 to be irrigated by insertion of the conical end of the housing 24 therein. This is accomplished in a manner which locates the outlet means 30 of the emitter 22 above the ground surface 56. One of the branch lines, or conduits, 20 is suitably connected to the fitting means 42, such as by means of a clamp 58.

Water under pressure within the trunk line 18 and the branch lines 20 of the trickle irrigation system 10 will enter into the bore 28 of the emitter housing 24 through the axial passage 40 of the cap 36. The float means 48 will be carried upwardly by the rising water supply within the housing 24 and the valve stem 52 will move into seated engagement with the valve seat 44 of the cap 36 when the water reaches a predetermined level as shown at 60 in FIG. 2. In addition to establishing the water supply in the manner described above, the float means 48 will interact with the valve seat 44 to maintain the water supply at a substantially constant water level 60 by allowing make-up water to enter the housing 24 as needed.

A force known as pressure head will act on the water supply causing it to trickle out of the emitter 22 through the outlet means 30. The pressure head, as is well known, results from the depth of the water supply, and in this case, the effective pressure head results from the depth, or distance, between the water level 60 and the outlet means 30. Due to the vent passage 46 of the cap 36, the upper portion of the bore 28, i.e. that portion above the water level 60, will be vented to ambient. This provides the water supply with what is referred to as a free upper surface. Therefore, the pressure head is the only force acting on the water supply to cause it to flow out of the emitter 22.

The diameter of the axial passage 32, or orifice, of the outlet means 30 will present a restriction to the free flow of water out of the emitter 22. Therefore, the outlet means 30 is sized so as to interact with the pressure head to achieve a desired output trickle flow rate. As will be appreciated, a virtually unlimited combination of head pressure values and output orifice sizes can be employed to achieve whatever trickle output flow rates are desired.

Therefore, the following examples of pressure head values and output orifice sizes and the flow rates achieved thereby are presented as examples only and are not to be construed as limitations of the present invention. A pressure head resulting from a four and one half inch water depth acting on a flat plate orifice having a diameter of 1/16 inch, 0.0620 inches, and a thickness of 0.020 inches, will produce a trickle output flow rate of 1.875 gallons per hour. The same flat plate orifice having a pressure head resulting from a two inch water depth acting thereon will produce a trickle output flow rate of 1.23 gallons per hour. It will be appreciated that the output flow rates of the above two examples will be even lower in the emitter 22 due to the length of the boss 31 of the outlet means 30. The length of the axial passage 32, i.e. thickness of the orifice, will increase the restriction over the above two examples due to friction of the water flow through the axial passage 32.

In that there are two basic variables involved in determining the trickle output flow rate of the emitter 22, there are, obviously, two basic ways in which the output flow rate can be altered to achieve the desired irrigation characteristics.

The first manner of altering the output flow rate of the emitter 22 involves changing, or replacement, of the flow restriction presented by the output means 30. The output means 30 can be replaced by a similar structure having an orifice of different diameters and/or configurations, and/or a different orifice thickness, or length.

The second manner of altering the output flow rate of the emitter 22 involves changing the depth of the water supply and thus the resulting pressure head, and there are several ways that this can be accomplished. A first way to alter the pressure head would be to selectively employ emitter housings having varying distances between the outlet opening 34 and the water level 60. Another way to accomplish this same objective would be to selectively employ float means having different valve stem lengths. And, yet another way to reduce the pressure head would be to mount the emitter 22 so that it is angularly disposed with respect to the ground surface 56 rather than in the illustrated upright position.

FIG. 3 shows a modified form of emitter housing which is indicated in its entirety by the reference numeral 22a. The emitter 22a functions and is configured in essentially the same manner as the hereinbefore fully described emitter 22. The main difference in the emitter 22a is that a plurality of outlet openings 62 are formed in spaced increments along the length of the emitter housing 24a. The outlet means 30 is selectively positionable in the desired one of the plurality of outlet openings 62, in accordance with a desired pressure head, and the unused outlet openings 62 are closed with suitable plugs 64, or are otherwise shutoff. A modified form of cap 36a may be used in the emitter 22a, however, the cap 36a functions in exectly the same manner as the cap 36, with the difference being that the cap 36a allows the depth of the water in the housing 24a to be increased by reversing the boss 38a so that it extends upwardly rather than into the housing as was the case with emitter 22.

FIGS. 1 and 4 show a different type of emitter 66 which is employed to simultaneously irrigate several separate areas at controlled trickle flow rates. The emitter 66 is connected directly to the trunk conduit 18 by means of the fitting means 67, as opposed to being connected to the terminal end of a branch line 20 as was the case in the hereinbefore described emitters 22 and 22a. The emitter 66 includes a housing 68 which is of tubular configuration, preferably cylindrical, with a pointed lower end 69. The bore 70 of the housing 68 is larger in diameter than those shown in emitters 22 and 22a to provide a larger reservoir therein for reasons which will become apparent as this description progresses. The housing 68 has at least a pair of outlet openings 72 formed therein with there preferably being a plurality of such outlet openings 72 formed in spaced increments along diametrically opposed sides of the cylindrical portion of the housing 68. As indicated in FIG. 1, there could be a plurality of separate vertically extending arrays of the outlet openings. As shown in FIG. 4, two outlet means 74, similar to the hereinbefore described outlet means 30, are mounted in opposite ones of the outlet openings 72 and each has a feeder hose 76 mounted thereon, and the unused outlet openings 72 may be closed with the plugs 78.

The emitter 66 further includes a cap 80 and a float means 82 which except for size, may be identical with the previously described caps 36 and 36a and the float means 48. When connected to the trunk line 18 and mounted in the ground surface 56, the relatively large water reservoir in the emitter housing 68 will be filled to the predetermined water level 84 in the manner hereinbefore fully described. The pressure head acting on the outlet means 74 will cause water to flow out of the feeder hoses 76 at predetermined trickle flow rates to the plural areas to be irrigated, and the flow rate of the individual feeder hoses 76 can be adjusted to suit by using, for example, the various outlet openings 72 at different positions along the length of the housing 68.

As hereinbefore mentioned, the bores formed in the housings 24, 24a and 68 extend downwardly into the closed, preferably pointed, lower ends of the housings. Those portions of the bores will serve to collect solid foreign particles, as indicated at 86, and thus serve as traps for the foreign matter which settles out of the water contained in the housings.

In order for the float controlled shutoff valve means, i.e. the valve seat 44 and the float valve 48 in emitter 22, and the similar structures in emitters 22a and 66, to function properly, the buoyancy of the float bodies must exert a valve closing force which is greater than the valve opening force exerted by the water pressure in the trunk and branch lines 18 and 20, respectively. In the absence of the pressure regulator 12, the water pressure in the trunk 18 and branch lines 20 would be an uncontrolled variable. In some instances this supply line pressure could be relatively small and the inherent buoyancy of the float body 50 would be adequate. That buoyancy of the body 50 could be increased by employing a float body (not shown) which is axially longer than that illustrated in, for example, FIG. 2. In most domestic water supply conduits, the water supply pressure is at least 50 PSI and this is quite high. In such instances the pressure regulator 12 would be required to reduce the supply line pressure to a reasonable lower value.

Figure 5:
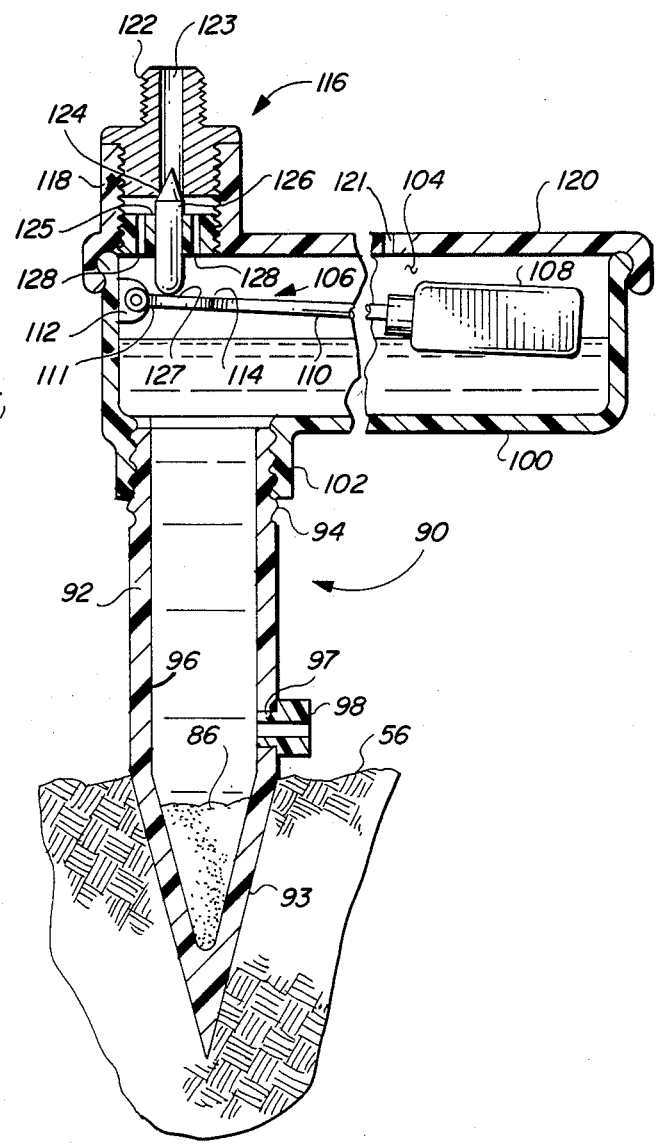
FIG. 5 is a sectional view taken along a vertical plane through a third embodiment of the emitters of the present invention.

If more buoyancy is desired than could reasonably be expected by using the float means 48 of reasonable size, a leverage system could be used, as for example in the emitter embodiment shown in FIG. 5. The emitter 90 of this embodiment includes an emitter housing 92 of the same general configuration shown at 24 in FIG. 2. The housing 92, therefore, is preferably of cylindrical configuration with a pointed lower end 93 and an externally threaded upper end as at 94. The housing 92 defines a bore 96 the lower end of which serves as a trap for collecting the foreign matter 86, and is provided with at least one outlet opening 97 which is preferably provided with an outlet means 98 similar to outlet means 30 hereinbefore described.

A float housing 100 having an internally threaded depending boss 102 is mounted on the upper end of the emitter housing 92 and the float housing defines a float chamber 104. The float controlled shutoff valve means 106 of this embodiment of the present invention includes a float body 108 mounted on the extending end of a lever arm 110, the opposite end 111 of which is pivotably mounted on a suitable bracket 112 provided in the float housing 100. The lever arm 110 is configured to provide a flat plate 114 proximate its pivot end 111 for engaging a shutoff valve means 116 which is mounted in an internally threaded boss 118 provided in a suitable cover 120 which is vented as at 121 and is carried on the float housing 100. The shutoff valve means 116 includes a fitting means 122 for connection to the trunk line 18, or one of the branch lines 20, and the fitting means 122 has an axial passage 123 formed therethrough and the fitting means is threadingly mounted in the upper end of the internally threaded boss 118. The fitting means 122 is disposed so that the lower end of the axial passage 123 thereof forms a valve seat 124. A valve body 125 is threadingly mounted in the lower end of the internally threaded boss 118 and a slide, or needle, valve 126 is axially slidably carried in an axial bore formed through the valve body. The lower end 127 of the slide valve 126 is in bearing engagement with the plate 114 of the lever arm 110. Thus, the slide valve 126 will move axially in the valve body 125 in response to pivotal movement of the lever arm to move the slide valve 126 into and out of seated engagement with the valve seat 124. The valve body 125 is formed with a plurality of radially arranged water passages 128 for admitting water from the axial passage 123 of the fitting means 122 into the float chamber 104 of the float housing 100.

The mechanical advantage achieved by mounting the float body 108 on the end of the lever arm 110 will multiply the inherent buoyancy of the float body and thus provide a considerably increased valve closing force on the slide valve 126.

With regard to the trickle system 10, the above described emitters, 22, 22a, 66 and 90 make it possible to eliminate the pressure regulator 12 in some instances, and will replace the relatively sophisticated filters of prior art systems with the simple strainer 16, and thus reduce maintenance and surveillance requirements of the system 10. In that the emitters 22, 22a, 66 and 90 do not contain any pressure reducing, or regulating, mechanisms of the types used in prior art emitters, the emitters of the present invention may be considered as substantially free flowing mechanisms with relatively large outlet openings. This, along with the sediment traps provided in the emitters results in the normal foreign matter found in water, such as sand and the like, either passing right through the emitters, or settling into the sediment traps thereof. Therefore, the strainer 16 of the system 10 need not have the filtration capabilities of the prior art systems and a simple straining capability will be sufficient to strain larger than normal foreign matter out of the water supply.

Figure 6:
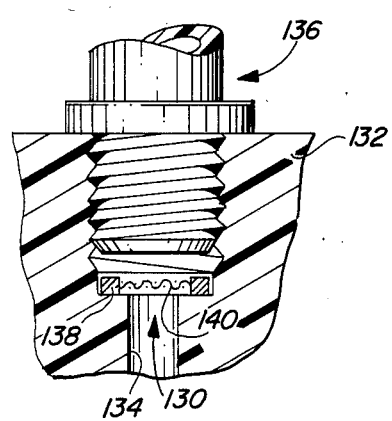
FIG. 6 is a fragmentary sectional view showing a modification of the emitters of the present invention.

Instead, or in addition to, the strainer 16 of the system 10, the emitters, 22, 22a, 66 and 90 of the present invention may be provided with strainer means 130 as shown in FIG. 6. The illustrated closure means 132, which is intended to be representative of the cap 36 of the emitter 22, or the cap 36a of the emitter 22a, or the cap 80 of the emitter 66, or the cover 120 of the emitter 90, is provided with a water inlet passage 134. The fitting means 136 is provided on the closure means 132 in a suitable manner, and the strainer means 130 is mounted in the inlet passage 134 immediately below the outlet end of the fitting means. The strainer means 132 is shown as being a disk shaped structure having a rigid ring-shaped body 138 with a screen 140 of suitable relatively large mesh mounted in a known manner therein.

While the principles of the invention have now been made clear in illustrated embodiments, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. An irrigation system having a single stage emitter for dispensing water under low pressure, said emitter comprising in combination:

(a) an elongated tubular single compartment housing having an upper end for receiving a flow of water under pressure from a source external to said housing, including a tubular sidewall said housing including means for receiving the flow of water at the upper end within an area generally circumscribed by a projection of said sidewall;

(b) an outlet disposed in said tubular sidewall of said housing in direct and immediate fluid communication with the water within said housing for discharging water from within said housing at essentially constant pressure, which pressure is a function only of the head pressure within said housing, said outlet being capable of discharging any water within said housing which water is at the elevation at or above said outlet;

(c) means for continuously venting said housing directly to the atmosphere to relieve any pressure within said housing which might be imposed by the source of water under pressure;

(d) means for maintaining the water level within the compartment of said housing essentially constant at an elevation above said outlet by controlling only the water flowing into said housing to establish the head pressure present at said outlet, said maintaining means including valve means disposed at the upper end of said housing for regulating the flow rate of water received by said housing as a function of the water level within said housing;

(e) said valve means including a float having a peripheral surface and being vertically positionally responsive to the height of the water within said housing, an inlet in fluid communication with the source of water under pressure and means associated with said float for controlling the flow of water though said inlet in response to vertical repositioning of said float; and (f) means for guiding said controlling means with respect to said inlet upon vertical positioning of said float, said means including said peripheral surface of said float and a bore of said housing.

2. An emitter as claimed in claim 1 wherein said inlet includes a valve seat and wherein said controlling means includes a valve stem for engaging said valve seat.

3. An emitter as claimed in claim 1 wherein said housing includes a sediment trap disposed vertically below said outlet for collecting sediment and debris introduced into said housing from the source of water under pressure and means for providing access to the interior of said housing for cleaning and removing any sediment and debris collected within said sediment trap.

4. An emitter as claimed in claim 1 wherein said outlet includes a boss for engaging a conduit, which conduit conveys the water discharged through said outlet to a point of water distribution.

5. An emitter as claimed in claim 1 including a plurality of said outlets disposed in said housing for providing a plurality of locations for discharging the water from within said housing.

6. An emitter as claimed in claim 5 wherein at least two outlets of said plurality of outlets are at different elevations below the water level within said housing to provide different head pressure, at the respective ones of said plurality of said outlets.

7. An emitter as claimed in claim 6 including means for closing selected ones of said plurality of outlets to terminate water flow therethrough.

8. An emitter as claimed in claim 7 wherein each of at least the nonselected ones of said plurality of outlets includes a boss for engaging a conduit, each of which conduits conveys the water discharged to a point of water distribution.

9. An emitter as claimed in claim 5 including means for closing selected ones of said plurality of outlets to terminate water flow therethrough.

10. An emitter as claimed in claim 9 wherein each of at least the nonselected ones of said plurality of outlets includes a boss for engaging a conduit, each of which conduits conveys the water discharged to a point of water distribution.

11. An emitter as claimed in claim 1 wherein said tubular structure includes a sediment trap configured as a cone shaped closure at the lower end of said tubular structure disposed below said outlet for collecting sediment and debris introduced into said housing from the source of water under pressure and means for providing at the top end of said tubular structure access to the interior of said housing for cleaning and removing any sediment and debris collected within said sediment trap.

12. An emitter as claimed in claim 11 where said providing means comprises a removable cap.

13. In an irrigation system, a method for dispensing water under low pressure from a tubular emitter in fluid communication with a source of water under pressure, said method comprising the steps of:
    (a) introducing into a housing the water received from the source of water under pressure, the housing having a single compartment defined in part by a sidewall;
    (b) discharging the water from the housing through an outlet disposed in the tubular sidewall at a pressure which is a function of the head pressure within the housing at the outlet and provided only that the water level within the housing is at an elevation at or above the outlet;
    (c) continuously venting the housing directly to the atmosphere to relieve any pressure within the housing which might be imposed by the source of water under pressure;
    (d) maintaining the water level within the compartment of the housing essentially constant to attempt to maintain a predetermined head pressure at the outlet by controlling only the water flowing into the housing; and
    (e) regulating the flow rate of the water received by the housing with a single stage regulator having a single float in response to exercise of said step of maintaining.

14. The method as recited in claim 13 including the step of collecting sediment and debris at a location within the housing which is below the elevation of the outlet.

15. The method as recited in claim 14 wherein said step of discharging includes the step of discharging the water through a plurality of outlets.

16. The method as recited in claim 13 wherein said step of discharging includes the step of discharging the water through a plurality of outlets and wherein at least two of the outlets are at different elevations.

* * * * *